United States Patent
Lee et al.

(10) Patent No.: US 6,649,052 B2
(45) Date of Patent: Nov. 18, 2003

(54) OZONE OXIDIZING APPARATUS

(75) Inventors: Jong-rai Lee, Seoul (KR); Se-ho Mun, Chungcheongnam-do (KR); Gwang-lok Han, Chungcheongnam-do (KR); Seong-lak Im, Chungcheongnam-do (KR); Seok-won Son, Seoul (KR)

(73) Assignee: IEI Co., Ltd. (KR)

( * ) Notice: Subject to any disclaimer, the term of this patent is extended or adjusted under 35 U.S.C. 154(b) by 114 days.

(21) Appl. No.: 10/040,368

(22) Filed: Jan. 9, 2002

(65) Prior Publication Data
US 2003/0127383 A1 Jul. 10, 2003

(51) Int. Cl.⁷ ............................. C02F 1/24; C02F 1/78; C02F 9/00; C02F 9/04; C02F 9/08
(52) U.S. Cl. .................. 210/221.2; 210/758; 210/760; 210/202; 210/205; 210/206
(58) Field of Search ............................. 210/221.2, 760, 210/202, 205, 206, 199, 294, 758

(56) References Cited

U.S. PATENT DOCUMENTS

| 4,156,648 | A | * | 5/1979 | Knepper |
| 5,053,140 | A | * | 10/1991 | Hurst |
| 5,180,499 | A | * | 1/1993 | Hinson et al. |
| 5,403,473 | A | * | 4/1995 | Moorehead et al. |
| 6,332,980 | B1 | * | 12/2001 | Moorehead |

FOREIGN PATENT DOCUMENTS

| JP | 05-317870 | * | 12/1993 |
| WO | 97/29997 | * | 8/1997 |

* cited by examiner

Primary Examiner—Thomas M. Lithgow
(74) Attorney, Agent, or Firm—Rothwell Figg Ernst & Manbeck, p.c.

(57) ABSTRACT

An ozone oxidizing apparatus in which, after fine air bubbles are distributed in a fluid (a waste water) delivered together with air to increase a dissolvable oxygen concentration, when ozone evenly contacts a contaminant of the fluid, oxidation is maximized by virtue of the instantaneous catalytic action of the oxygen air bubbles, thereby effectively removing the contaminant contained in the fluid.

1 Claim, 4 Drawing Sheets

OZONE OXIDIZING APPARATUS

BACKGROUND OF THE INVENTION

1. Field of the Invention

The present invention relates to an ozone oxidizing apparatus, and more particularly, to an ozone oxidizing apparatus in which, after fine air bubbles are distributed in a fluid (a waste water) delivered together with air to increase a dissolvable oxygen concentration, when ozone evenly contacts contaminant of the fluid, oxidation is maximized by virtue of the instantaneous catalytic action of the oxygen air bubbles, thereby effectively removing the contaminant contained in the fluid.

2. Description of the Background Art

Recently, as technologies are being rapidly developed in various industrial fields, water pollution due to waste water becomes serious. In order to solve the problem, there has been proposed an oxidation and sterilizing method utilizing ozone.

However, in the conventional oxidizing and sterilizing method using ozone, air bubbles are injected in a water tub by using an oxygen gas tube or an injector, resulting in a problem that waste ozone is much generated in its use. In addition, since the contact efficiency between the fluid and ozone is low, the contaminant contained in the fluid is not effectively processed to be purified.

SUMMARY OF THE INVENTION

Therefore, an object of the present invention is to provide an ozone oxidizing apparatus in which, after fine air bubbles are distributed in a fluid (a waste water) delivered together with air to increase a dissolvable oxygen concentration, when ozone evenly contacts a contaminant of the fluid, oxidation is maximized by virtue of the instantaneous catalytic action of the oxygen air bubbles, thereby effectively removing the contaminant contained in the fluid.

To achieve these and other advantages and in accordance with the purpose of the present invention, as embodied and broadly described herein, there is provided an ozone oxidizing apparatus including: an inlet pipe into which fluid flows by means of a delivery pump and to which a venturi-type injector is attached; an air bubble generator having a spray nozzle for spraying downwardly fluid which has been pressedly delivered together with an adequate amount of air which has been sucked by the injector and an air bubble generating tube installed outside the spraying nozzle for generating air bubbles and contacting the air bubbles together with the sprayed fluid on the surface of the water; an air bubble generating tower for receiving the fluid attached on the surface of the fine air bubbles by the air bubble generator and increasing generation of fine air bubbles by using an influx head; an injector for mixing ozone gas generated by an ozone generator and the fluid when the fluid passed the air bubble generating tower is pressurized and delivered to other place by an ozone contacting pump; an ozone contacting unit having a contacting container in which large and small passages are formed in a spiral shape in a vertical direction so as for the fluid to repeatedly make a centripetal movement when the fluid mixed with ozone gas is pressedly delivered upwardly, and a pressure controlling tube disposed outside the contacting container for collecting non-contacted residual ozone gas at the upper portion, and flowing downwardly to re-contact ozone with fluid; an ozone oxidizer having an inclined plate for lifting the oxidized fluid upwardly when a perforated drain pipe evenly distributes the fluid as the fluid oxidized in the ozone contacting unit flows in at the lower portion, and a skimmer installed at the upper end for removing a contaminant when the contaminant is lifted along with the inclined plate and drifts; a filter having partitions for multi-layer stacking filter mediums so that when the fluid passed through the ozone oxidizer passes the opening of a baffle and is delivered upwardly, the fluid is filtered by the discharge pump and a purified water is discharged to the discharge pipe.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
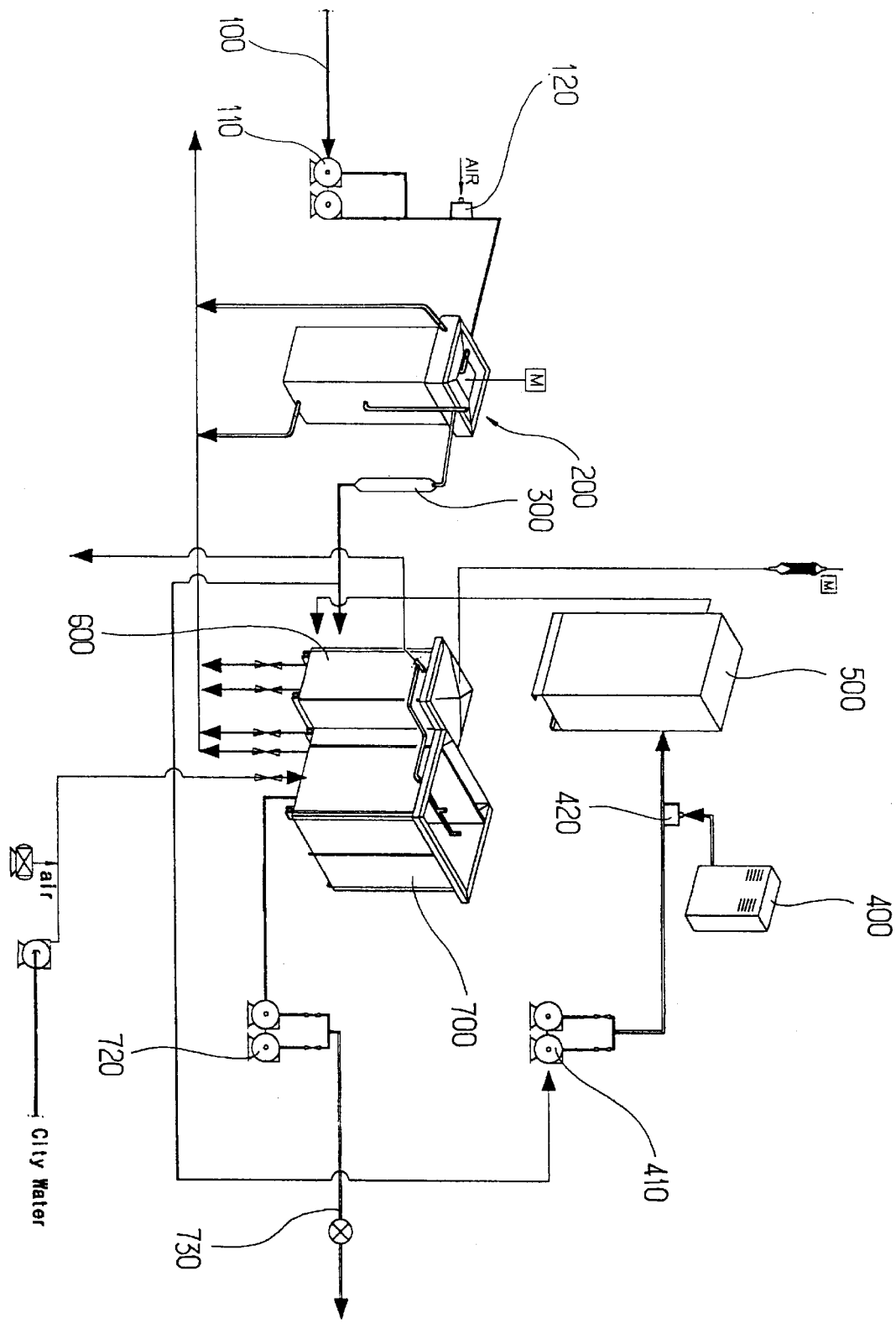
FIG. 1 is a schematic view of a construction of an ozone oxidizing apparatus in accordance with the present invention.
Figure 2:
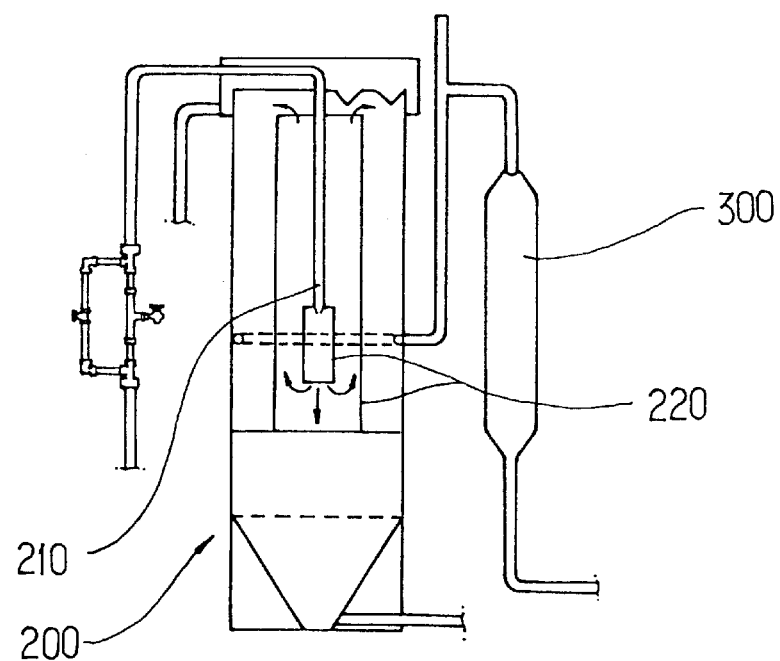
FIG. 2 is a sectional view of an air bubble generator in accordance with the present invention.
Figure 3:
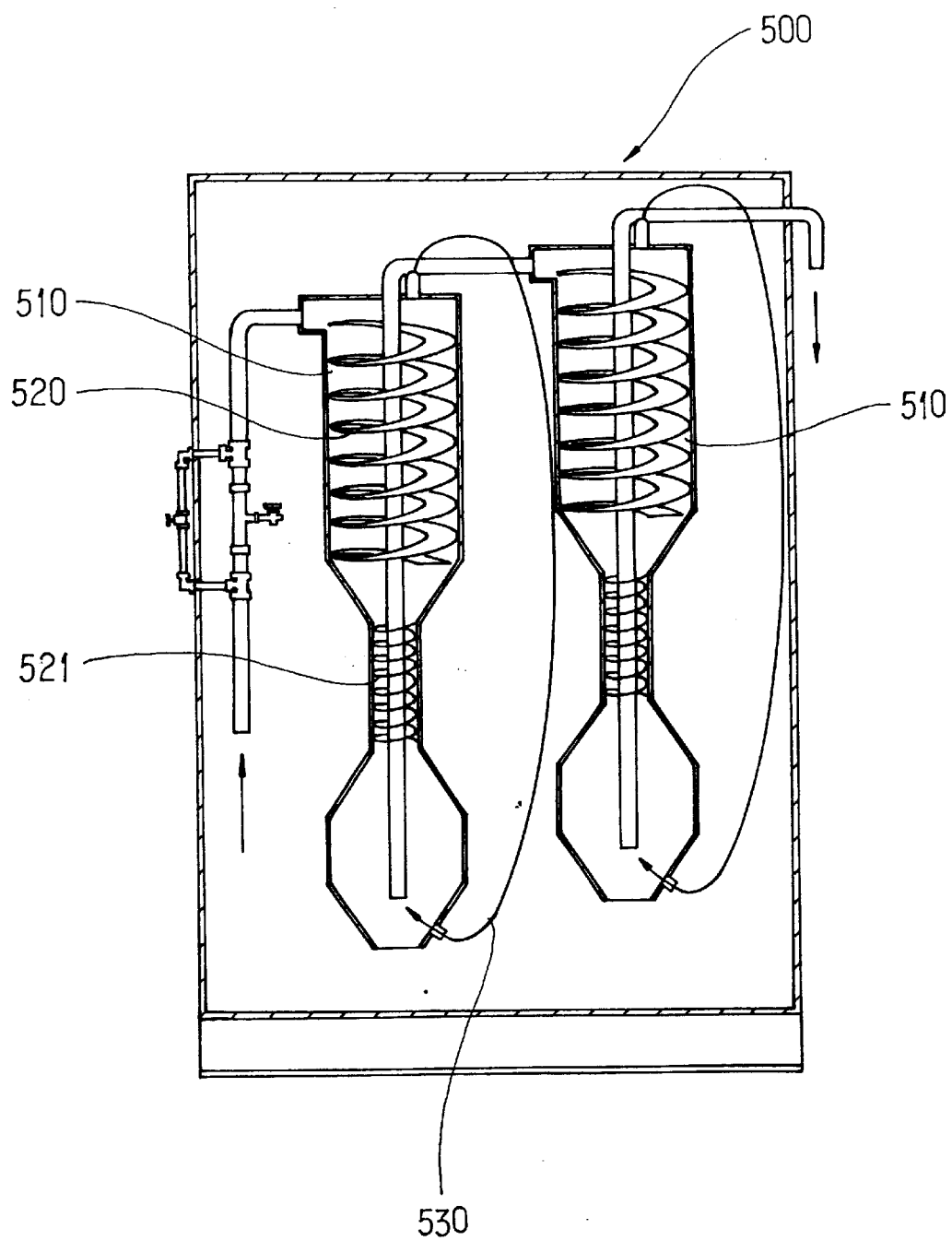
FIG. 3 is a sectional view of an ozone contacting unit in accordance with the present invention.
Figure 4:
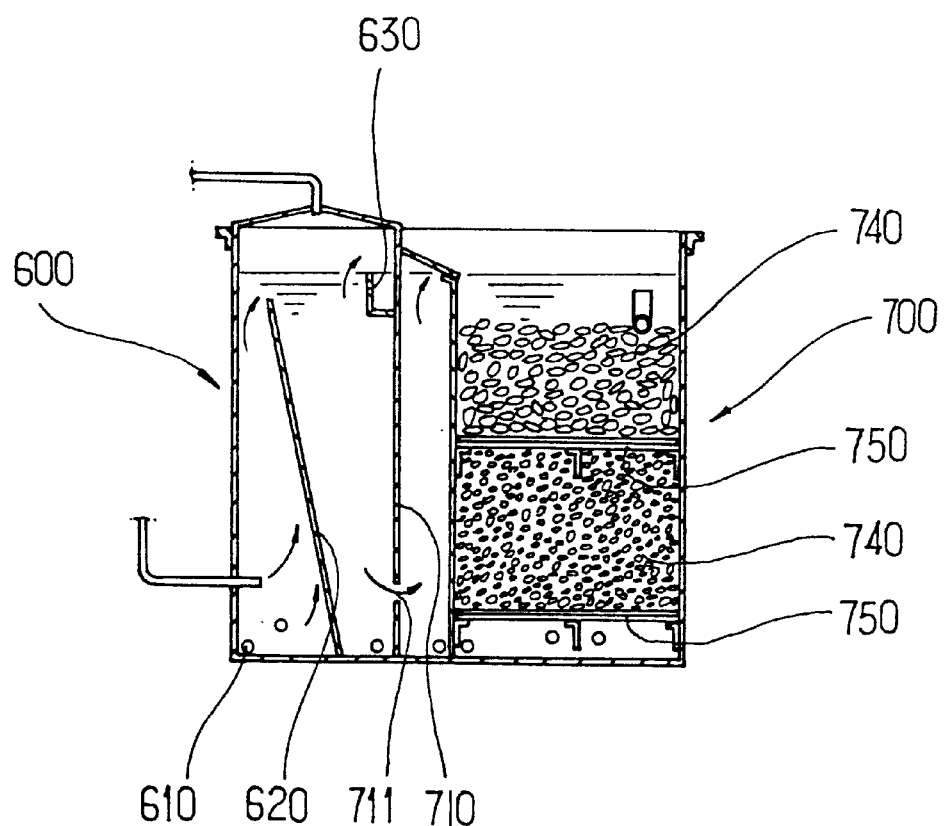
FIG. 4 is sectional views of an ozone oxidizer and a filter in accordance with the present invention.

FIG. 1 is a schematic view of a construction of an ozone oxidizing apparatus in accordance with the present invention, FIG. 2 is a sectional view of an air bubble generator in accordance with the present invention, FIG. 3 is a sectional view of an ozone contacting unit in accordance with the present invention, and FIG. 4 is sectional views of an ozone oxidizer and a filter in accordance with the present invention.

As shown in the drawings, an ozone oxidizing apparatus of the present invention includes an inlet tube 100 to which fluid flows by means of a transfer pump 110 and a venturi-type injector 120 is attached; an air bubble generator 200 for contacting fine air bubbles with the fluid pressedly delivered through the inlet tube; an air bubble generating tower 300 for receiving the fluid attached on the surface of the fine air bubble by the air bubble generator 200 and increasing generation of more fine air bubbles by using the influx head; an injector 420 for mixing ozone gas generated in the ozone generator 400 and the fluid when the fluid passed through is pressurized by an ozone contacting pump 410 and delivered to other place; an ozone contacting unit 500 and an ozone oxidizer 600 for contacting ozone gas generated by the ozone generator 400 and the fluid to maximize oxidation with an indirect reaction and direct reaction of ozone; and a filter 700 for filtering contaminant which has not been removed yet by the ozone contacting unit 500 and the ozone oxidizer 600 and discharging only purified water to a discharge pipe 730.

The air bubble generator 200 includes a spray nozzle 210 for spraying downwardly the fluid when the fluid is pressedly delivered together with an adequate amount of air sucked by the injector 120, and an air bubble generating tube 220 formed outside the spray nozzle 210 for generating air bubbles and contacting the air bubbles and the fluid with the surface of water.

The ozone contacting unit 500 includes a contacting container 510 having a big spiral passage 520 and a small spiral passage 521 in the vertical direction for rendering the fluid mixed with ozone gas to make a centripetal movement repeatedly when it is pressedly delivered to the upper portion by the ozone generator 400, and a pressure controlling tube 530 installed outside the contacting container 510 for collecting non-contacted residual ozone gas at the upper portion and flowing it downwardly to re-contact ozone with the fluid.

The ozone contacting unit 500 of the present invention includes a pair of the contacting containers 510 which are organically connected by a connecting tube. In this respect, however, the number of the contacting containers 510 installed in the ozone contacting unit 500 is not limited to the two ones as shown in FIG. 3. That is, a plurality of the contacting units 510 or a small number of contacting units may be formed in so far as it effectively contacts the fluid and the ozone gas.

The ozone oxidizer 600 includes a perforated drain pipe for evenly distributing the fluid when the fluid oxidized in the ozone contacting unit 500 flows in at the lower portion, an inclined plate 620 for rendering the oxidized fluid to float upwardly, and a skimmer 630 formed at the upper end for removing contaminant when the contaminant contained in the fluid floats along with the inclined plate and drifts.

The filter 700 serves to remove contaminant which has not been removed yet in the ozone oxidizer 600, having a system in which the fluid flows from the upper portion to the lower portion in a state that the upper portion is opened.

When the fluid passed through the ozone oxidizer 600 is delivered to the upper portion through the opening 711 of the baffle 710, the fluid is filtered by a motor pump 720, so that purified water can be discharged to the discharge pipe 730. In this respect, there are provided partitions 750 for multi-layer stacking filter mediums 740 and a hole is formed at the partitions 750 through which the fluid passes.

The air bubble generator 200, the air bubble generating tower 300, the ozone generator 400, the ozone contacting unit 500, the ozone oxidizer 600 and the filter 700 are connected with a transfer line to each other to deliver the fluid. Such connections of the transfer line are the same as a widely-used general technique, descriptions of which is thus omitted.

Also, the ozone oxidizing apparatus of the present invention is adoptable to decontamination and water purification equipment for water-purifying and grey water system processing according to its use, as well as waste water processing and purifying.

As the ozone oxidizing apparatus of the present invention constructed as described above is operated, the fluid (the waste water) flows into the inlet pipe 100 by the transfer pump 110, and the influx fluid is pressedly delivered into the air bubble generator 200 together with an adequate amount of air sucked by the venturi-type injector 120.

The fluid pressedly delivered by the air bubble generator 200 is sprayed in the air bubble generating tube 220. At this time, the fluid contacts the surface of water while being sprayed with the air bubbles, and since fine air bubbles of duplex film are generated during contacting the surface of water, oxygen is easily dissolved.

And, the contaminant in the fluid is delivered to the air bubble generating tower 300 as being attached to the surface of the fine air bubbles. Once the fluid is delivered to the air bubble generating tower 300, fine air bubbles are more generated due to the influx head while being delivered from the upper portion to the lower portion, and pressurized and delivered to the ozone contacting unit 500 by the motor pump 410.

At this time, the fluid is mixed with ozone gas generated in the ozone generator 400 and then delivered to the ozone contacting unit 500.

The fluid and ozone gas delivered to the ozone contacting unit 500 makes a centripetal movement successively along with the spiral type large and small passages 520 and 521 formed within the contacting container 510, during which ozone evenly contacts the contaminant of the fluid at a high speed due to the catalytic action of the oxygen bubble. Thus, thanks to the direct reaction and indirect reaction of the ozone, oxidation is maximized.

At this time, as the non-contacting residual ozone gas collected at the upper portion of the contacting container 510 flows from the upper portion of the pressure controlling tube 530 downwardly, the pressure in the contacting container 510 is controlled and re-contact, of which process is performed repeatedly, so that residual ozone is not discharged. And, the fluid contacting the ozone while making centripetal movement also makes centripetal movement continuously in the next contacting container 510 through the connecting tube.

When the fluid is delivered to the ozone oxidizer 600, the second oxidizing apparatus, after passing the ozone contacting unit 500, the perforated drain pipe 610 evenly distributes it. Then, the oxidized contaminant is adsorbed to the surface of lots of air bubbles and lifted along with the inclined plate 620 and drifts. While drifting, the contaminant is removed by the skimmer 630 attached on the opposite wall surface. The fluid without contaminant is delivered to the filter 700 through the opening 711 of the baffle 710.

Through the above process, the fluid passes the filter medium 740 of the filter 700 according to the pumping force by the discharging pump 720, so that the contaminant (oxidized solid matter) which has been not removed yet is filtered and thus a purified fluid is delivered to the discharge pipe 730.

Meanwhile, the filter medium 740 is prevented from being dispersed owing to the partitions 750 during back washing, so that it is maintained in a state that the filter medium 740 is fixed by beds, constantly maintaining the quality of the filtered water.

As so far described, according to the ozone oxidizing apparatus of the present invention, after fine bubbles are distributed in the fluid (the waste water) delivered together with air to increase a dissolvable oxygen concentration, when ozone evenly contacts the contaminant of the fluid, oxidation is maximized by virtue of the instantaneous catalytic action of the oxygen air bubbles. Accordingly, the contaminant contained in the fluid is effectively removed.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An ozone oxidizing apparatus comprising:

an inlet pipe into which fluid flows by means of a delivery pump and to which a venturi-type injector is attached;

an air bubble generator having a spray nozzle for spraying downwardly fluid which has been pressedly delivered together with an adequate amount of air which has been sucked by the injector and an air bubble generating tube installed outside the spraying nozzle for generating air bubbles and contacting the air bubbles together with the sprayed fluid on the surface of the water;

an air bubble generating tower for receiving the fluid attached on the surface of the fine air bubbles by the air bubble generator and increasing generation of fine air bubbles by using an influx head;

an injector for mixing ozone gas generated by an ozone generator and the fluid when the fluid passed the air bubble generating tower is pressurized and delivered to other place by an ozone contacting pump;

an ozone contacting unit having a contacting container in which large and small passages are formed in a spiral shape in a vertical direction so as for the fluid to repeatedly make a centripetal movement when the fluid mixed with ozone gas is pressedly delivered upwardly, and a pressure controlling tube disposed outside the contacting container for collecting non-contacted residual ozone gas at the upper portion, and flowing downwardly to re-contact ozone with fluid;

an ozone oxidizer having an inclined plate for lifting the oxidized fluid upwardly when a perforated drain pipe evenly distributes the fluid as the fluid oxidized in the ozone contacting unit flows in at the lower portion, and a skimmer installed at the upper end for removing a contaminant when the contaminant is lifted along with the inclined plate and drifts;

a filter having partitions for multi-layer stacking filter mediums so that when the fluid passed through the ozone oxidizer passes the opening of a baffle and is delivered upwardly, the fluid is filtered by the discharge pump and a purified water is discharged to the discharge pipe.

* * * * *